(12) United States Patent
Buzzard et al.

(10) Patent No.: US 12,253,281 B2
(45) Date of Patent: Mar. 18, 2025

(54) IMMERSIBLE APPARATUS FOR CIRCULATING AND HEATING LIQUID IN A VESSEL

(71) Applicant: 80West Labs LLC, Chicago, IL (US)

(72) Inventors: Kyle A. Buzzard, Vicksburg, MI (US); Nathaniel M. Rasmussen, Lincoln, NE (US); Kyle B. Vest, Waverly, NE (US); Nick Koukourakis, Stevensville, MI (US)

(73) Assignee: 80West Labs LLC, Chicago, IL (US)

( * ) Notice: Subject to any disclaimer, the term of this patent is extended or adjusted under 35 U.S.C. 154(b) by 520 days.

(21) Appl. No.: 17/246,792

(22) Filed: May 3, 2021

(65) Prior Publication Data
US 2021/0348802 A1    Nov. 11, 2021

Related U.S. Application Data

(60) Provisional application No. 63/023,190, filed on May 11, 2020.

(51) Int. Cl.
*F24H 1/10*    (2022.01)
*A47J 27/10*    (2006.01)
(Continued)

(52) U.S. Cl.
CPC .......... *F24H 1/101* (2013.01); *F24H 1/0072* (2013.01); *F24H 1/06* (2013.01); *F24H 9/06* (2013.01);
(Continued)

(58) Field of Classification Search
CPC .......... F24H 1/0072; F24H 1/06; F24H 1/101; F24H 1/20; F24H 1/201–203; F24H 9/06; F24H 9/25; F24H 9/2028; F24H 15/174; F24H 15/34; F24H 15/37; F24H 15/45; F24H 15/212; F24H 15/269;
(Continued)

(56) References Cited

U.S. PATENT DOCUMENTS

| | | | |
|---|---|---|---|
| 4,872,224 A * | 10/1989 | Grimes | A61H 33/6026 392/471 |
| 2016/0037956 A1* | 2/2016 | Wu | A47J 27/10 99/403 |

(Continued)

*Primary Examiner* — Joe E Mills, Jr.
(74) *Attorney, Agent, or Firm* — Clements Bernard Walker; Christopher L. Bernard; Devin Cummins

(57) ABSTRACT

Disclosed embodiments include apparatuses, systems, and methods for circulating and managing temperature of a liquid in a vessel. An illustrative embodiment includes an apparatus having a control section with a pump to receive liquid and expel the liquid via a pump outlet, a temperature interface to modulate a supply of energy, and a control interface to direct operation of the pump and the temperature control interface. An immersible section is configured to be at least partially immersed in the liquid and includes at least one temperature control surface to heat the liquid in response to the energy received from the temperature interface, a pump inlet to draw the liquid into the pump, and a filtration housing covering the at least one temperature control surface and the pump inlet to prevent particles over a predetermined size from passing into the pump inlet and coming into contact with the at least one temperature control surface.

20 Claims, 16 Drawing Sheets

(51) Int. Cl.
  *F24H 1/00*     (2022.01)
  *F24H 1/06*     (2022.01)
  *F24H 9/06*     (2006.01)
  *F24H 9/20*     (2022.01)
  *F24H 9/25*     (2022.01)
  *F24H 15/174*   (2022.01)
  *F24H 15/212*   (2022.01)
  *F24H 15/269*   (2022.01)
  *F24H 15/281*   (2022.01)
  *F24H 15/34*    (2022.01)
  *F24H 15/37*    (2022.01)
  *F24H 15/395*   (2022.01)
  *F24H 15/414*   (2022.01)
  *F24H 15/45*    (2022.01)

(52) U.S. Cl.
  CPC ............. *F24H 9/2028* (2013.01); *F24H 9/25* (2022.01); *F24H 15/174* (2022.01); *F24H 15/281* (2022.01); *F24H 15/34* (2022.01); *F24H 15/37* (2022.01); *F24H 15/45* (2022.01); *A47J 27/10* (2013.01); *F24H 15/212* (2022.01); *F24H 15/269* (2022.01); *F24H 15/395* (2022.01); *F24H 15/414* (2022.01)

(58) Field of Classification Search
  CPC ... F24H 15/395; F24H 15/414; H05B 1/0283; H05B 2203/021
  See application file for complete search history.

(56) References Cited

U.S. PATENT DOCUMENTS

| | | | |
|---|---|---|---|
| 2018/0106501 A1* | 4/2018 | Hinton | F24H 15/421 |
| 2019/0143858 A1* | 5/2019 | Conner | H05B 1/0238 |
| | | | 219/217 |
| 2019/0170397 A1* | 6/2019 | Saubert | F24H 15/37 |
| 2019/0246455 A1* | 8/2019 | Weber | H05B 3/80 |

* cited by examiner

IMMERSIBLE APPARATUS FOR CIRCULATING AND HEATING LIQUID IN A VESSEL

FIELD

The present disclosure relates to apparatuses, systems, and methods for circulating and managing temperature of a liquid in a vessel.

BACKGROUND

The statements in this section merely provide background information related to the present disclosure and may not constitute prior art.

Cooking liquids or cooking foods immersed in liquid may involve heating, stirring, and otherwise working with a quantity of liquid. For one example, brewing beer entails many steps including the heating processes of mashing and boiling. The mashing process involves steeping grains, such as barley, in hot water in a pot, kettle, or other vessel. The mashing process converts starches in the grains into fermentable sugars. Depending on the recipe used, the mashing process entails maintaining the liquid in the vessel at a particular temperature to successfully extract the sugars and flavors from the grains. Once the mashing process is complete, during the boiling process the liquid is to be kept at a boil while secondary ingredients, such as hops, are added to properly distribute and keep sediment centered in the vessel. After the boiling process is complete, the liquid is transferred out of the vessel into one or more other containers for fermentation, carbonation, and other processes.

For those desiring to brew beer at home, these steps may result in a cumbersome, labor-intensive process. For example, monitoring the mashing process, stirring the liquid, and adjusting the temperature applied to the kettle to keep the liquid at the desired temperature take a not insignificant amount of time and care. Still, despite using due care, variations in the temperature within the kettle or during the mashing process may result in a less than desirable final product. Although there are specially-made vessels to provide temperature control, these vessels may be expensive and bulky, thus involving an appreciable investment of money and space for an apparatus that may not be frequently used.

SUMMARY

Disclosed embodiments include apparatuses, systems, and methods for circulating and managing temperature of a liquid in a vessel.

In an illustrative embodiment, an apparatus includes a control section including a pump configured to receive liquid and expel the liquid via a pump outlet, a temperature interface configured to modulate a supply of energy, and a control interface configured to direct operation of the pump and the temperature control interface. An immersible section extends from the control section and configured to be at least partially immersed in a vessel containing the liquid. The immersible section includes at least one temperature control surface operably coupled with the temperature interface and configured to heat the liquid in response to the energy received from the temperature interface, a pump inlet coupled to the pump and configured to draw the liquid into the pump, and a filtration housing covering the at least one temperature control surface and the at least one pump inlet, where the filtration housing is configured to block particles over a predetermined size from passing into the pump inlet and coming into contact with the at least one temperature control surface.

In another illustrative embodiment, a system includes a control section including a pump configured to receive liquid and expel the liquid via a pump outlet configurable to provide a flow chosen from a circulation output configured to circulate the liquid within a vessel and a discharge output configured to pump the liquid out of the vessel and a temperature interface configured to modulate a supply of energy. An immersible section extends from the control section and is configured to be at least partially immersed in the liquid. The immersible section includes at least one temperature control surface operably coupled with the temperature interface and configured to heat the liquid in response to the energy received from the temperature interface. The immersible section also includes a pump inlet coupled to the pump and configured to draw the liquid into the pump. The immersible section also includes a removable filtration housing covering the at least one temperature control surface and the at least one pump inlet, where the filtration housing is configured to block particles over a predetermined size from passing into the pump inlet and coming into contact with the at least one temperature control surface. A detached control unit is electrically couplable with the control section and is configured to direct operation of the pump and the temperature control interface from outside of the vessel.

In another illustrative embodiment, a method includes selectively heating liquid in a vessel with at least one temperature control surface. The liquid is pumped from the vessel and generates an output flow chosen from a circulation flow directed back into the vessel and a discharge flow into a second vessel. The liquid is filtered to prevent to prevent particles in the liquid over a predetermined size from being drawn into the pump and from coming in contact with the at least one temperature control surface. Selective heating and pumping of the liquid is controllable from a location outside of the vessel.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the figure number in which the element first appears.

Figure 1:
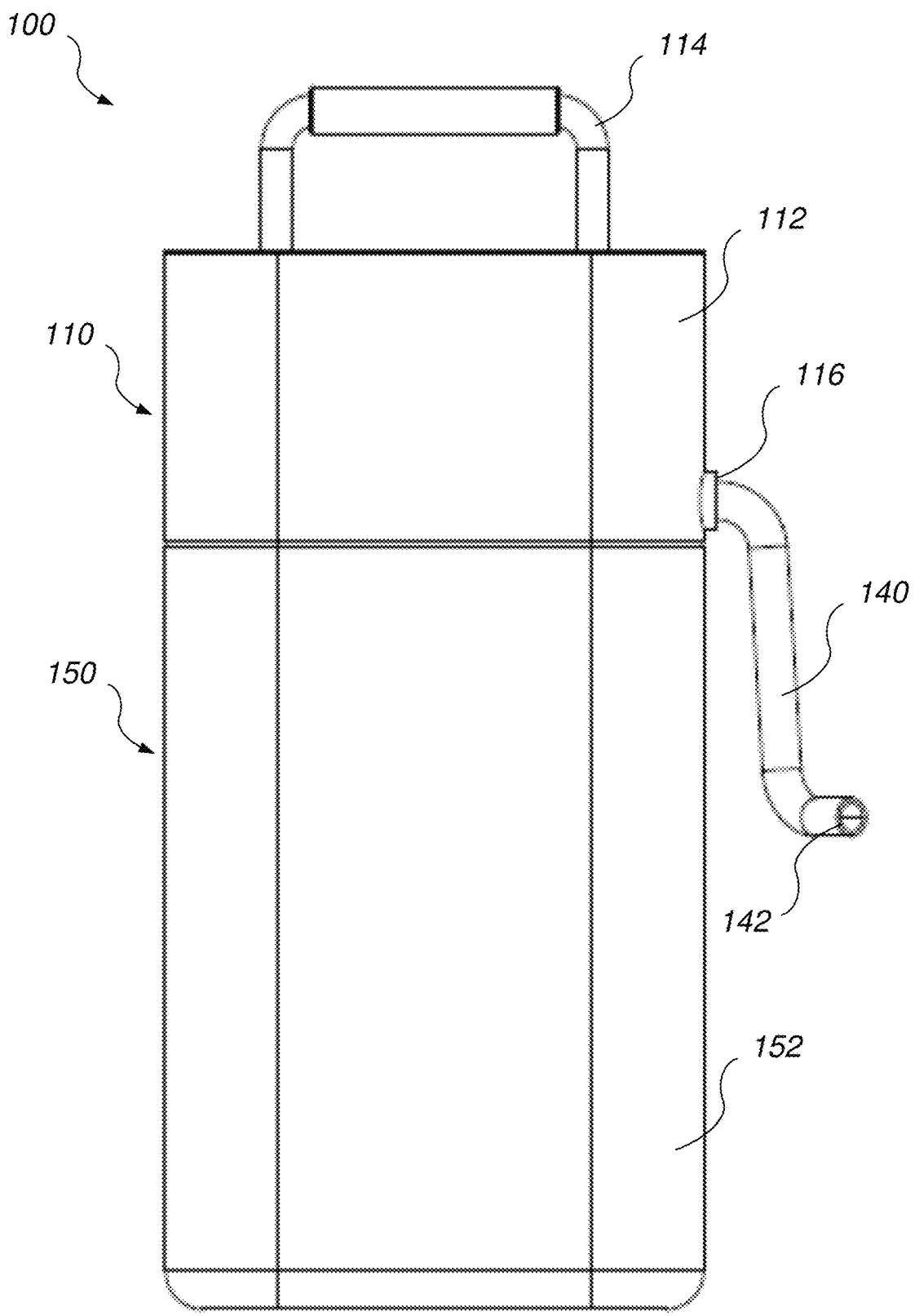
FIG. 1 is a front plan view of an illustrative immersible system.

Referring to FIG. 1 and given by way of non-limiting overview, in various embodiments an illustrative immersible system 100 has a control section 110 and an immersible section 150. As further described below, the control section 110 includes a control housing 112 that encloses mechanisms such as a pump, temperature controls, and other mechanisms, none of which are shown in FIG. 1. The immersible section 150 is adapted to be inserted into a pot, kettle, vat, barrel, or other vessel containing a liquid (not shown in FIG. 1) and immersed in the liquid. A handle 114 that extends from the control housing 112 allows for the entire immersible system 100 to be moved into or out of vessels that contain liquid therein.

In various embodiments, the immersible section 150 includes a filtration housing 152 that is configured to permit the flow therethrough of liquids but blocks the flow of fluids over a desired size limit. Within the filtration housing 152, and as further described below, the immersible section 150 encloses a pump inlet and one or more temperature control surfaces, none of which are shown in FIG. 1. The porosity of the filtration housing 152 thus may be configured to block particles, such as grains or other solid ingredients used in a brewing process, from being drawn into the pump inlet and, thus, blocking or damaging the impeller of the pump housed in the control section 110. Similarly, the porosity of the filtration housing 152 may be configured to filter out particles that might adhere to the temperature control surface and, thus, block the surface of or potentially damage the temperature control surfaces. The filtration housing 152 may be a formed of porous metal, cloth, plastic, or ceramic filtration materials, or some combination thereof.

For example, the filtration housing 152 may include a mesh frame that includes a metal or plastic mesh that is covered with a cloth material. In such embodiments, the mesh frame may provide a porous frame over which a material configured to block penetration by particles over a predetermined size may be spread. As a result, the mesh frame may be washable in place and reusable, and the covering material may be removed for washing or replacement. In various embodiments, instead of the filtration housing 152, a screen, shield, or other structure may be used to prevent particles from being drawn into a pump inlet and/or contact the temperature control surfaces.

Liquid drawn through the filtration housing 152 of the immersible section 150 and drawn into the pump inlet (not shown in FIG. 1) is impelled through the pump (not shown in FIG. 1) and expelled through a pump outlet 116 in the control housing 112. A flow pipe 140 may be coupled to the pump outlet 116, and an outlet 142 of the flow pipe 140 may be directed back into the liquid outside of the filtration housing 152. Thus, when the immersible section 150 is inserted into a liquid and the pump and the temperature control surfaces are active, liquid may be drawn by the pump through the filtration housing 152 over the temperature control surfaces and into the pump inlet. The pump then expels the liquid drawn through the pump inlet out through the pump outlet 116 and out through the outlet 142 of the flow pipe 140 back into the liquid outside of the filtration housing 152, thereby causing the liquid to circulate. In sum, the immersible system 100 may be inserted into a vessel of liquid where it heats or cools the liquid and circulates the liquid to promote even heating or cooling of the liquid in the vessel.

Figure 2:
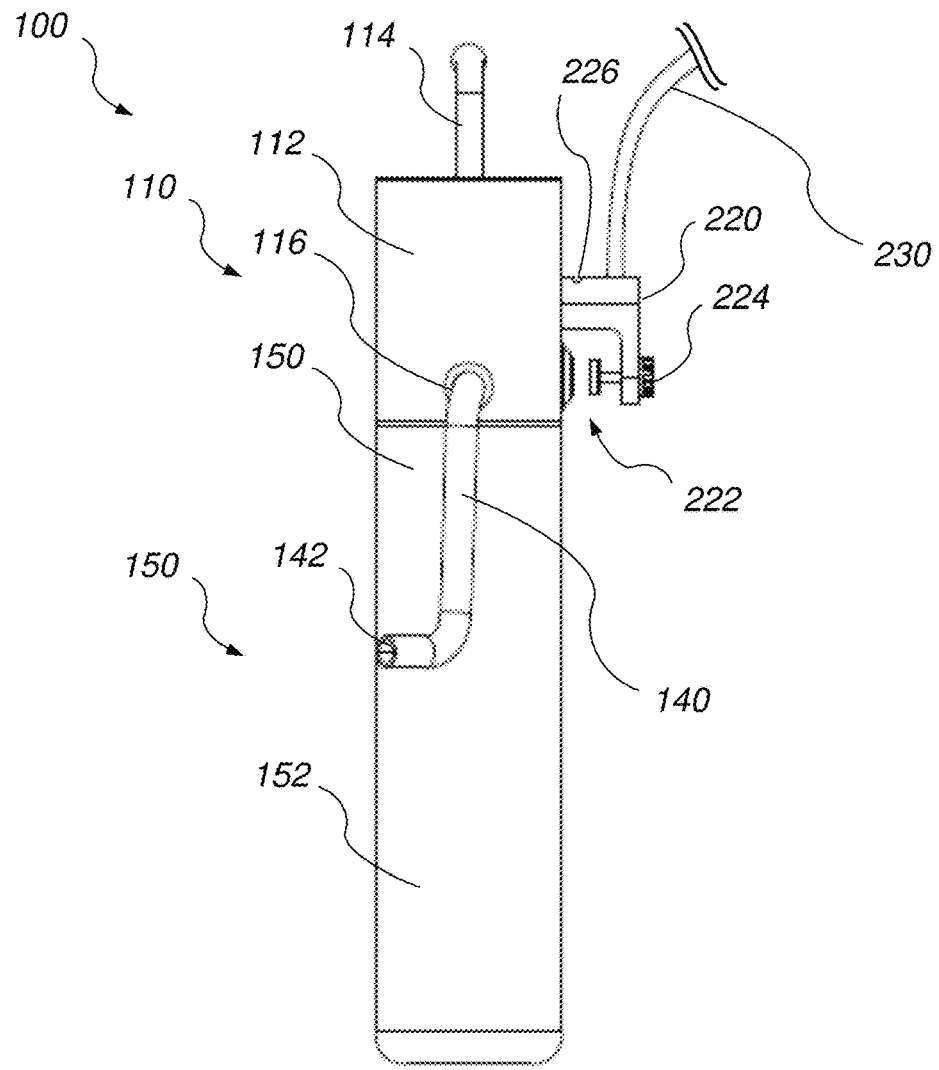
FIG. 2 is a side plan view of the immersible system of FIG. 1.

Referring additionally to FIG. 2, the immersible system 100 also includes a support bracket 220 to engage a side of a vessel (not shown in FIG. 2) into which the immersible system 100 is to be inserted. The support bracket 220 thus may be used to support the immersible system 100, such as through a mechanical coupling with the control section 112, to support the immersible system 100 relative to the wall of the vessel. The bracket 220 may extend from the control housing 112 of the control section 110 so that, when the bracket 220 abuts an edge of the vessel, the bracket 220 prevents the control section 110 from being further inserted into the vessel and/or being fully immersed in the liquid received within the vessel. The support bracket 220 also may be configured to hold the immersible system at a distance from the wall and or the base of the vessel to facilitate the flow of liquid into the immersible section 150.

In various embodiments, the support bracket 220 includes a clamp 222. The bracket 220 and/or the clamp 222 may be configured so that, once the bracket 220 is in place on the edge of the vessel, the clamp 222 that may be adjusted to hold the immersible system 100 in place so that it will not be dislodged by the flow of liquid generated by the pump, as previously described, or by other forces. In various embodiments, the clamp 222 may be adjusted or tightened by turning a clamping bolt 224. In various embodiments, the bracket 220 also may include a slot 226 to receive a hanger (not shown in FIG. 2) mounted or mountable on the vessel to adjustably secure the immersible system 100 to the vessel, as further described with reference to FIGS. 7-9.

In various embodiments, a power cable 230 extends from the control section 110 of the immersible system 100. The power cable 230 may be a household electrical cord ending in a standard two-prong or three-prong plug. The power cable 230 thus enables the immersible system 100 to receive power from an electrical outlet to power the temperature control surfaces, the pump, and other electrically-powered components. As shown in FIG. 2, the power cable 230 extends from the control section 110 near or from the bracket 220 which extends outwardly from the control section 110 away from the vessel of liquid. In various embodiments, the power cable 230 desirably extends from the control section 110 at a location away from the liquid to keep the junction of the power cable 230 and the control section 110 from being splashed to prevent potential electrical shorting.

Figure 3:
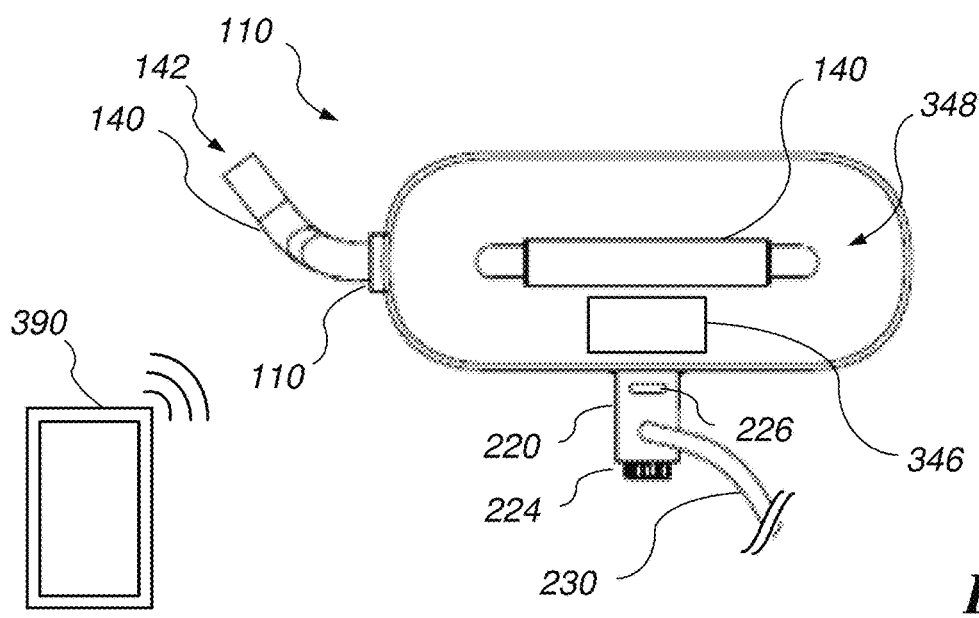
FIG. 3 is a top plan view of the immersible system of FIG. 1 and a remote control device.

Referring additionally to FIG. 3, in various embodiments, the control section 110 includes an integrated control panel 346 that allows control of the temperature control surfaces and the pump of the immersible system 100. The integrated control panel 346 may include a number of input and output devices, including a display indicative of the temperature settings and current temperature, a desired heating time, a pump speed, and other information. Similarly, the integrated control panel 346 may include a number of switches to turn on or off the temperature control surfaces and/or the pump. The switches may be physical switches or the switches and the display may be combined into a touchscreen. The integrated control panel 346 may be positioned on a top surface 348 of the control section 110 where it may be accessed by an operator positioned at a side of a vessel into which the immersible system 100 has been inserted. As further described below, the immersible system 100 also may be controlled by a detached control unit from outside the vessel and/or via another remote device configured to communicate with the control section 110 directly or via the detached control unit.

In addition to or instead of the control panel 346 disposed on the control section 110, a remote control device 390 also may be provided to display the same information and/or to support inputs to control operation of the immersible system 100, as further described below. The remote control device 390 may be a dedicated control device that is coupled by wired (not shown in FIG. 3) or wireless communication with the control section 110 to control the temperature control surfaces, pump, or other devices. In some embodiments, the remote control device 390 may communicate with the control section 110 via radio frequency (RF) communications using a special bandwidth as desired. In some other embodiments, the remote control device 390 may use Wi-Fi, Bluetooth, wireless telephony, or other communications protocols to communicate with the control section 110. The remote control device 390, instead of being a dedicated device, may be presented with a software application or "app" executing on a smartphone, tablet computer, or other communications devices that communicates with the control section using Wi-Fi, Bluetooth, wireless telephony, or other communications protocols. As is common with other smartphone apps, the smartphone may display information and receive control signals via touchscreen controls. The remote control device 390 is further described below with reference to FIGS. 11 and 14.

Figure 4:
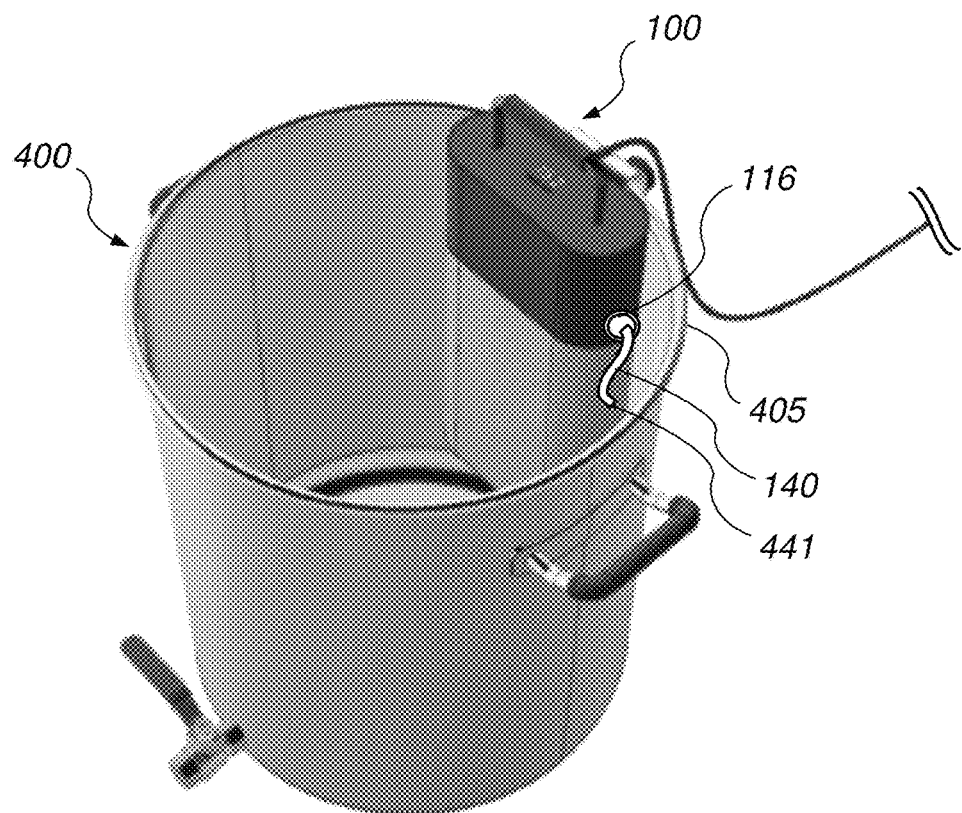
FIG. 4 is a perspective view of the immersible system of FIG. 1 inserted in a vessel.

Referring additionally to FIG. 4, in various embodiments the immersible system 100 may be inserted into and clamped onto the side of a vessel 405 using the support bracket 220 (FIG. 2). Grains, water, and other materials to be used in the process may be placed into an interior 407 of the vessel 405 according to a recipe or other method. The contents of the vessel 405 may be heated and/or circulated by the immersible system 100. In FIG. 4, it is noted that the output line 140 coupled with the pump outlet 116 is within an interior 407 of the vessel 405. As a result and as previously described, when the pump (not shown in FIG. 4) is running, liquid may be drawn into the immersible system 100 through the filtration housing 152, circulated through the pump, and discharged via the output line 140 through a circulation output 441 to circulate the liquid contents within the vessel 405. The output line 140 may be shaped or directable to drive the output liquid to facilitate the circulation of the liquid in the vessel 405 as desired.

In various embodiments, the pump outlet 116 and the output line 140 are usable either to circulate liquid in the vessel 405 in which the immersible system 100 is inserted or to transfer the liquid to a secondary vessel (not shown in FIG. 4). For example, it may be desirable after completion of the boiling process to transfer the liquid into the secondary vessel for fermentation, carbonation, or other processes. Accordingly, in various embodiments, the outlet line 140 is configurable to be used as a transfer line or the outlet line 140 may be replaced with another line at the pump outlet 116 to transfer the liquid into the secondary vessel.

Figure 5:
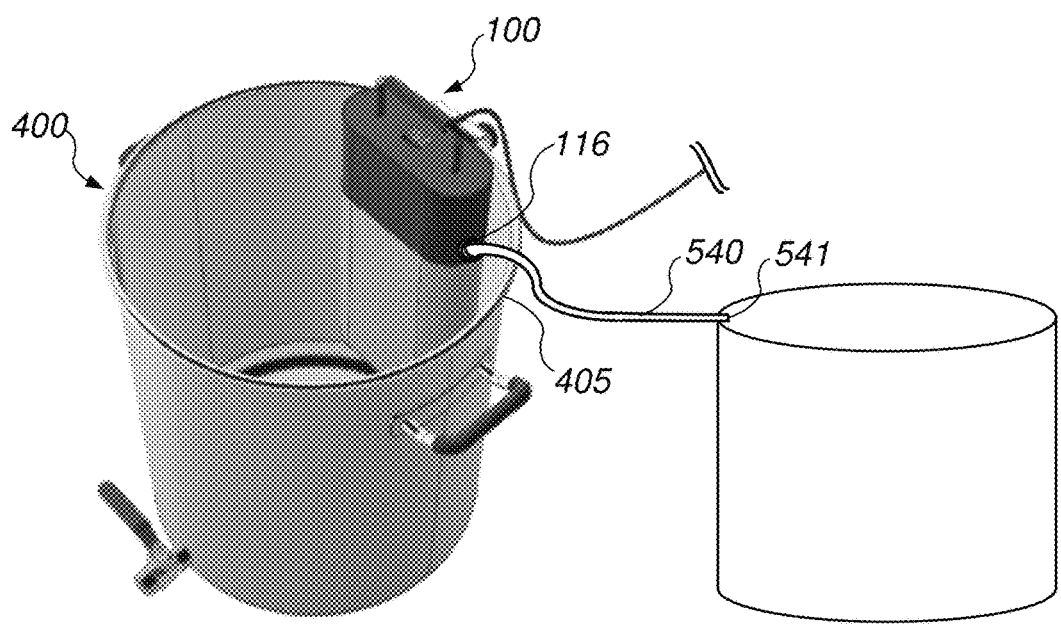
FIG. 5 is a perspective view of the immersible system of FIG. 1 inserted in a vessel with a discharge line positioned to transfer liquid out of the vessel into a secondary vessel.

Referring additionally to FIG. 5, in various embodiments the immersible system 100 has a discharge line 540 coupled with the pump outlet 116 of the immersible system 100 to transfer the liquid into a secondary vessel 505. Thus, the pump of the immersible system 100 may serve dual purposes of circulating liquid within the vessel 405 during the mashing and boiling processes and transferring liquid out of the vessel 405 to further subsequent aspects of the process. The discharge line 540 may be a flexible version of the outlet line 140 used to circulate the liquid in the vessel that is reconfigurable to, instead of being placed in the vessel 405 to circulate the liquid in the vessel, be extended into the second vessel 505. While extended into the second vessel 505, the pump may be used to pump the liquid via the pump outlet 116 and the discharge line 540 and out of a discharge output 541 into the secondary vessel 505. In various embodiments, the outlet line 140 may be sufficiently flexible and/or extendible to be reconfigured to transfer the liquid from the pump outlet 116 into another vessel 505 instead of for circulating liquid within the vessel 405.

In other embodiments, the discharge line 540 may be a separate conduit that replaces the outlet line 140 at the pump outlet 116. The outlet lines 140 and 540 may be interchangeable via threaded, frictionally engaged, or snap-connectable couplings to the pump outlet 116. Thus, while a rigid conduit may be desirable for use as the outlet line 140 for recirculating liquid in the vessel 405, a longer, more flexible outlet line 540 may be desirable for transferring liquid from the vessel to the secondary vessel 505.

Figure 6A:
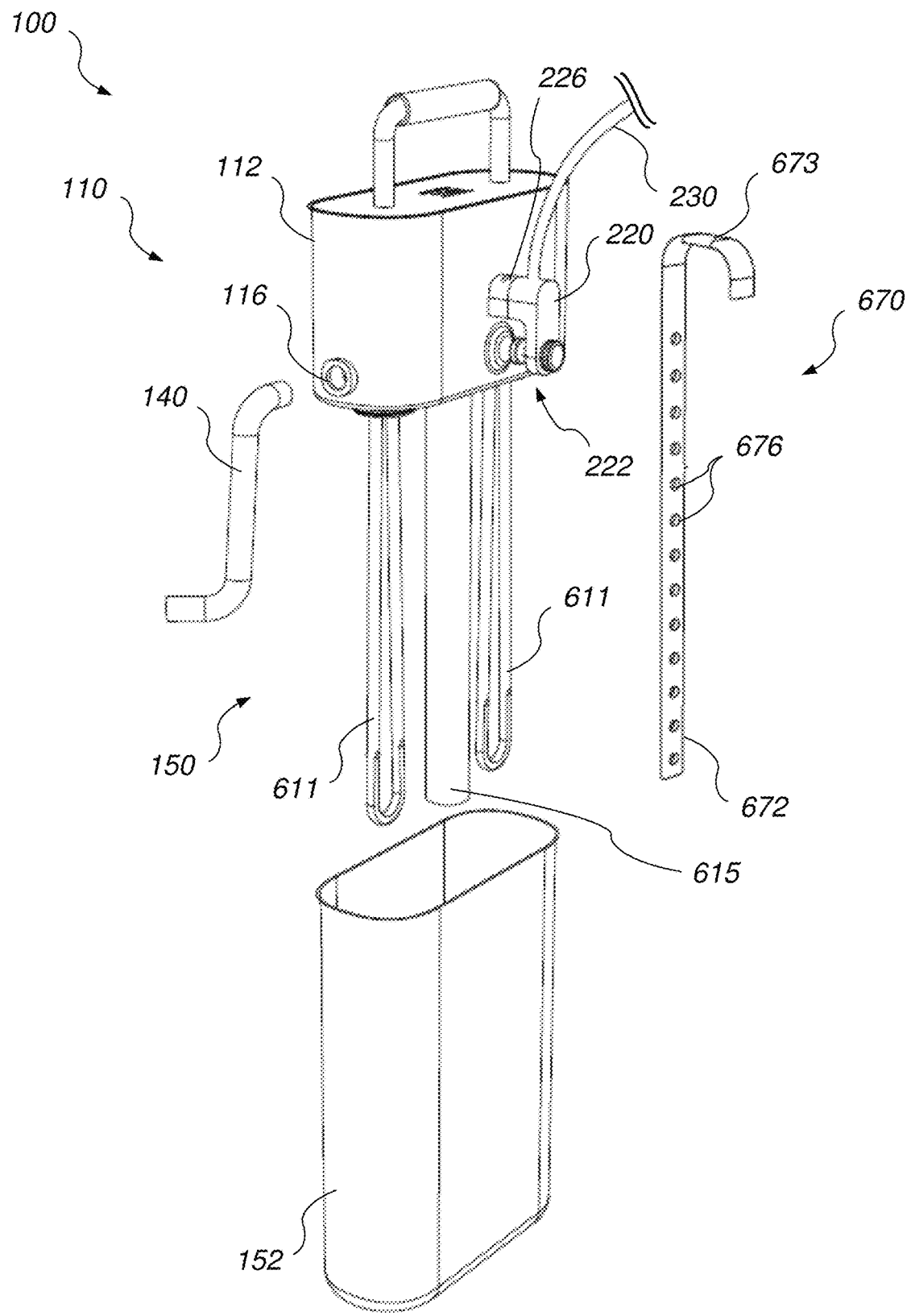
FIGS. 6A-6D are partially exploded perspective views of components of the immersible system of FIG. 1 securable in a vessel by a support hanger with different temperature control surfaces.

Referring additionally to FIG. 6A, in various embodiments the immersible section 150 includes temperature control surfaces 611 and a pump inlet 615 where they may be in contact with liquid that flows through the filtration housing 152. The temperature control surfaces 611 may be immersible electric heating coils. Although two temperature control surfaces 611 are shown in FIG. 6A, it will be appreciated that one temperature control surface or more than two temperature control surfaces may be used. It also will be appreciated that, while the temperature control surfaces 611 are shown outside of the pump inlet 615, the temperature control surfaces 611 may be integrated with or disposed within the pump inlet 615 or within the control housing 112, as further described below. Embodiments of the immersible system 100 are not limited to any particular number or configuration of the temperature control surfaces 611 or pump inlet 615.

In addition, as previously described, the outlet line 140 is shown as being removable from the pump outlet 116 to be replaceable with a transfer outlet line 540, as previously described with reference to FIG. 5. As also previously described, the outlet line 140 may be configured with a shape and rigidity suited to circulating liquid within a vessel, while a more flexible and/or longer flexible outlet line 540 may be better suited for pumping liquid out of the vessel 405 into a secondary vessel 505 (FIG. 5).

Continuing to refer to FIG. 6A, to allow for the immersible system 100 to be used in vessels of different sizes or in preparing batches of liquid that may have different liquid levels, in various embodiments the immersible system 100 may use a support bracket in the form of a support hanger 670. The support hanger 670 has a shaft 672 receivable into the slot 226 of bracket 220 of the control section 110. The support hanger 670 includes a shaft 672 that extends downwardly from a hooked upper portion 673 configured to hang over a rim of the vessel. The immersible system 100 may be secured at various positions along the shaft 672. The position may be selected so that the immersible section 150 of the immersible system 100 is immersed beneath the surface of the liquid in the vessel. The shaft 672 of the support hanger 670 includes a plurality of recesses 676 that may be positively engaged by the clamp 222 to hold the immersible system 100 in place.

Figure 6B:
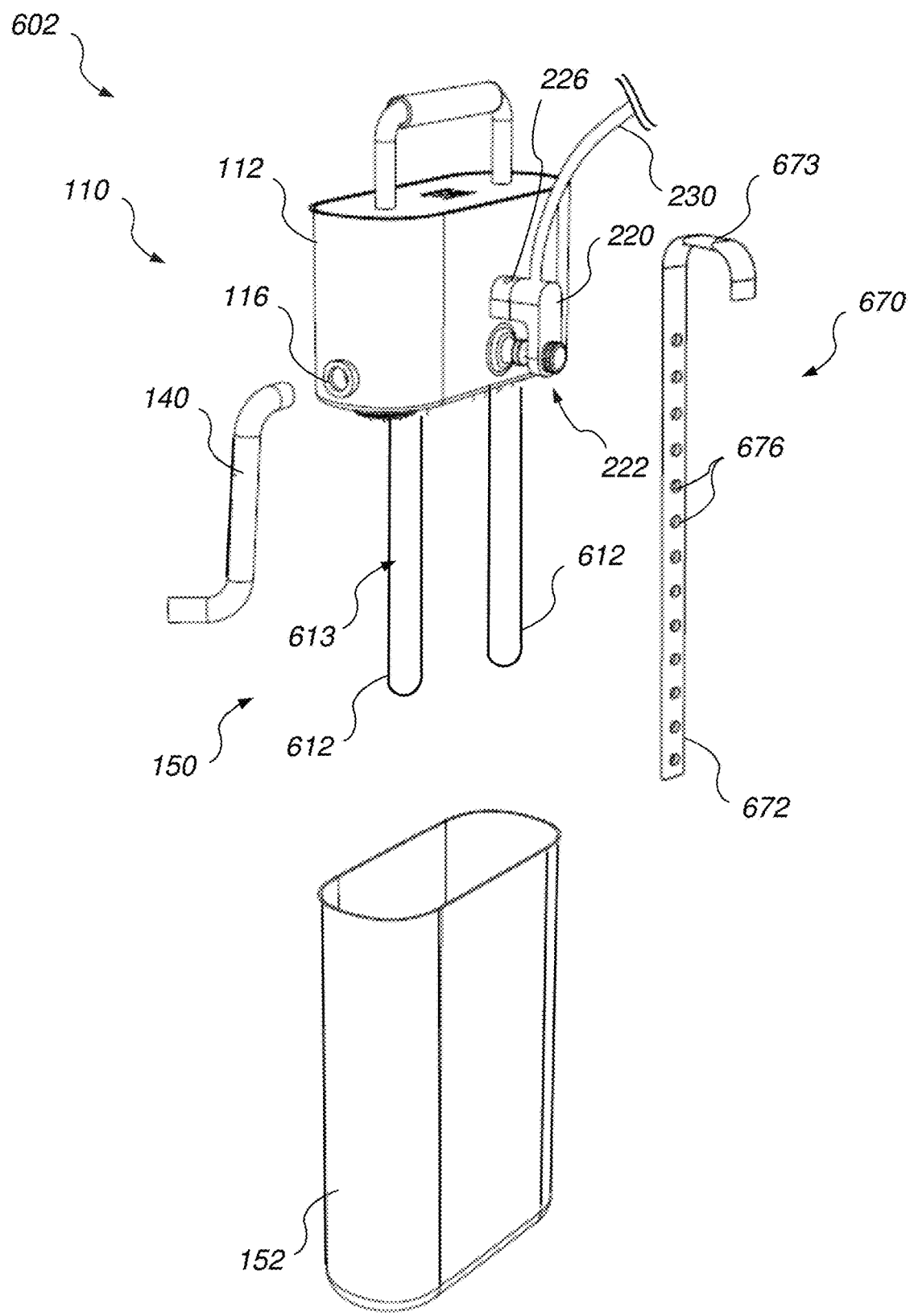
Figure 6C:
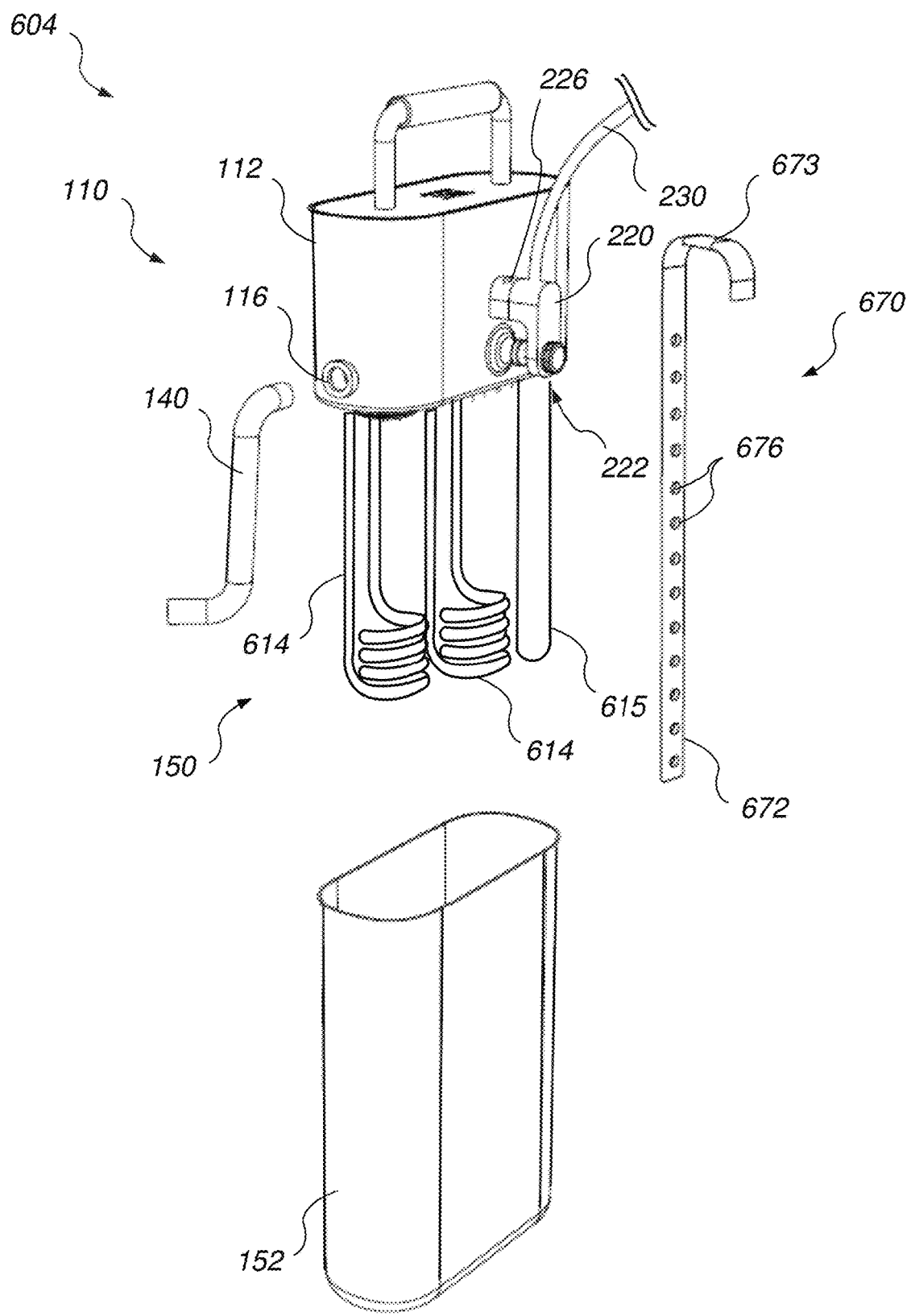
Figure 6D:
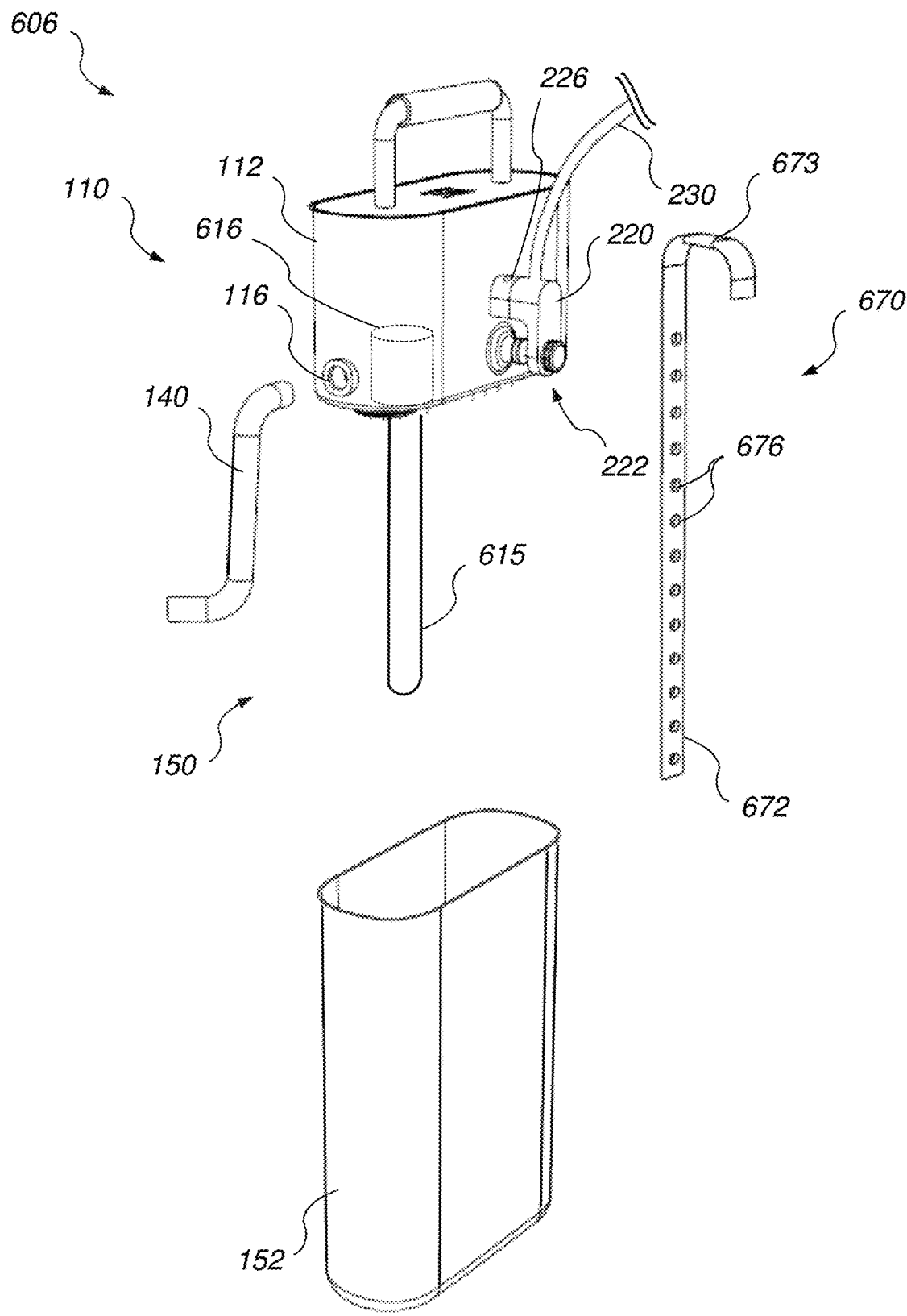

As previously described, in various embodiments different configurations of the temperature control surfaces 611 may be used. Referring additionally to FIG. 6B, an immersible system 602 includes integrated heating element and pipe inlets 612. The integrated elements 612 have outer surfaces 613 to heat the liquid as a result of the immersion of the integrated elements 612 in the liquid, as well as inner surface area (not shown in FIG. 6B) to heat the liquid as the liquid is drawn into the pump. Referring additionally to FIG. 6C, an immersible system 604 includes coiled temperature control surfaces 614 instead of the temperature control surfaces 611, which were presented as elongated loops. The coiled temperature control surfaces 614 may present a larger surface area as compared to the temperature control surfaces 611 of FIG. 6A, which potentially may provide for faster or more distributed heating. Referring additionally to FIG. 6D, in various embodiments an immersible system 604 includes one or more internal temperature control surfaces 616 coupled to receive and heat liquid as the liquid is drawn through the pipe inlet 615 to heat the liquid as it is pumped through the control section 110. Embodiments of the immersible system are not limited to any particular configuration or number of temperature control surfaces.

Figure 7:
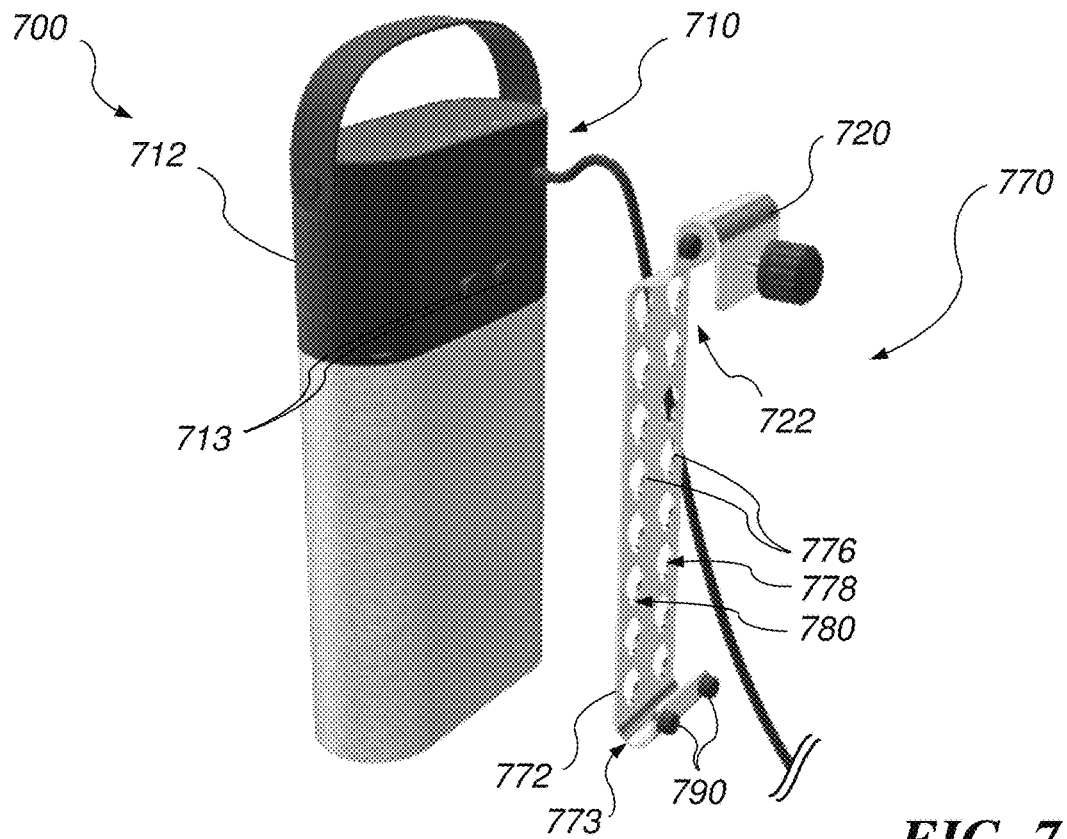
FIGS. 7 and 8 are perspective views of another embodiment of the immersible system securable in a vessel by a support bracket.
Figure 8:
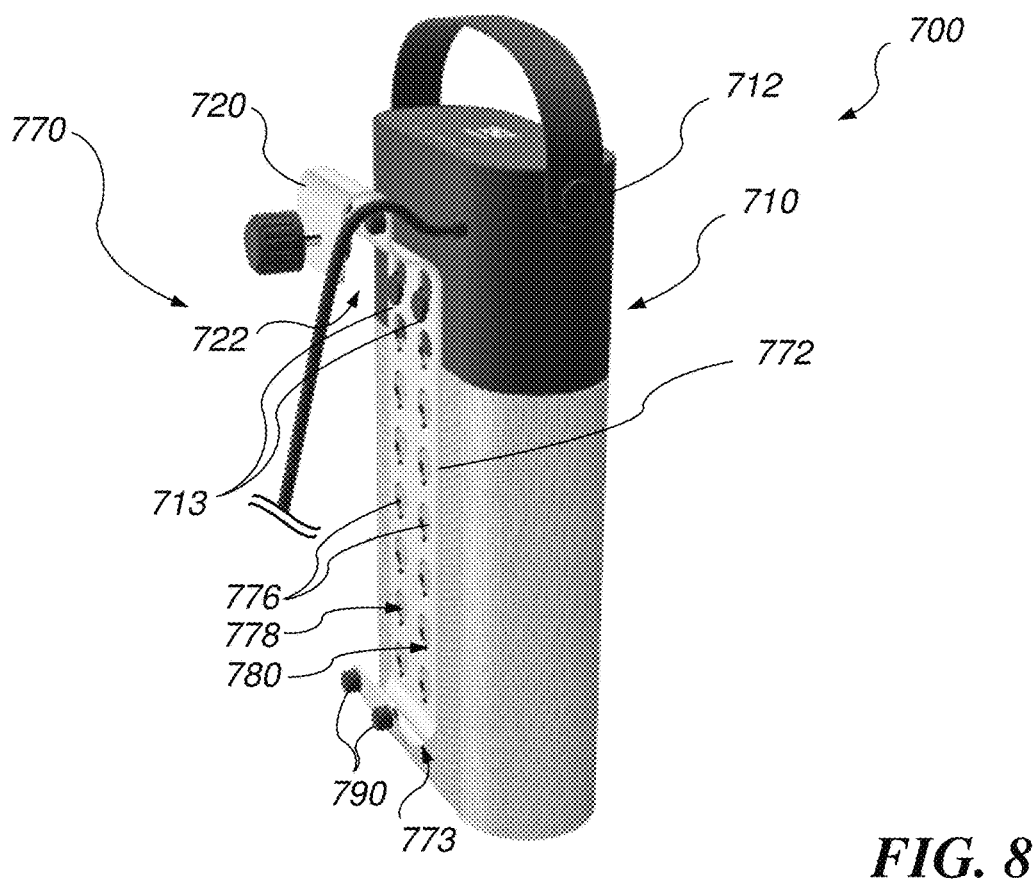

Various embodiments may employ different forms of support hangers. Referring to FIGS. 7 and 8, in another embodiment of an immersible system 700, instead of a hanger 670 that is received in the slot 260 of the bracket 220 (FIG. 6), a shaft 772 of a hanger 770 may include tapered eyelets 776 that engage rivets 713 extending from a control housing 712 containing a control section 710 of the immersible system 700. The rivets 713 are configured to be received into openings 776 in the shaft 772. Each of the openings 776 have wide portions 778 through which a head of a rivets 713 may extend and a narrow portion 780 to engage a shaft of the rivet 713 and, thus, hold the rivet 713 in place. The hanger 770 may include a bracket 720 for engaging a rim of a vessel (not shown in FIG. 7) and a clamp 722 to allow the hanger 770 to be secured to the rim of the vessel. A lower end 773 of the shaft 772 of the hanger 770 also may include bumpers 790 to brace the hanger 770 against a lower, interior surface of the vessel and to hold the shaft 772 out from the side of the vessel to enable the rivets 713 to be extended therethrough.

When the hanger 760 is in place, the immersible system 700 may be lowered into the vessel, the rivets 713 may be inserted into the wide portions 778 of one or more openings 776 at a desired position relative to the vessel and/or a level of the liquid therein. After the rivets 713 are extended through the openings 776, then the immersible system 700 may be further lowered to position shafts of the rivets 713 into the narrow portions 780 of the openings 776 to hold the immersible system 700 in place.

Figure 9:
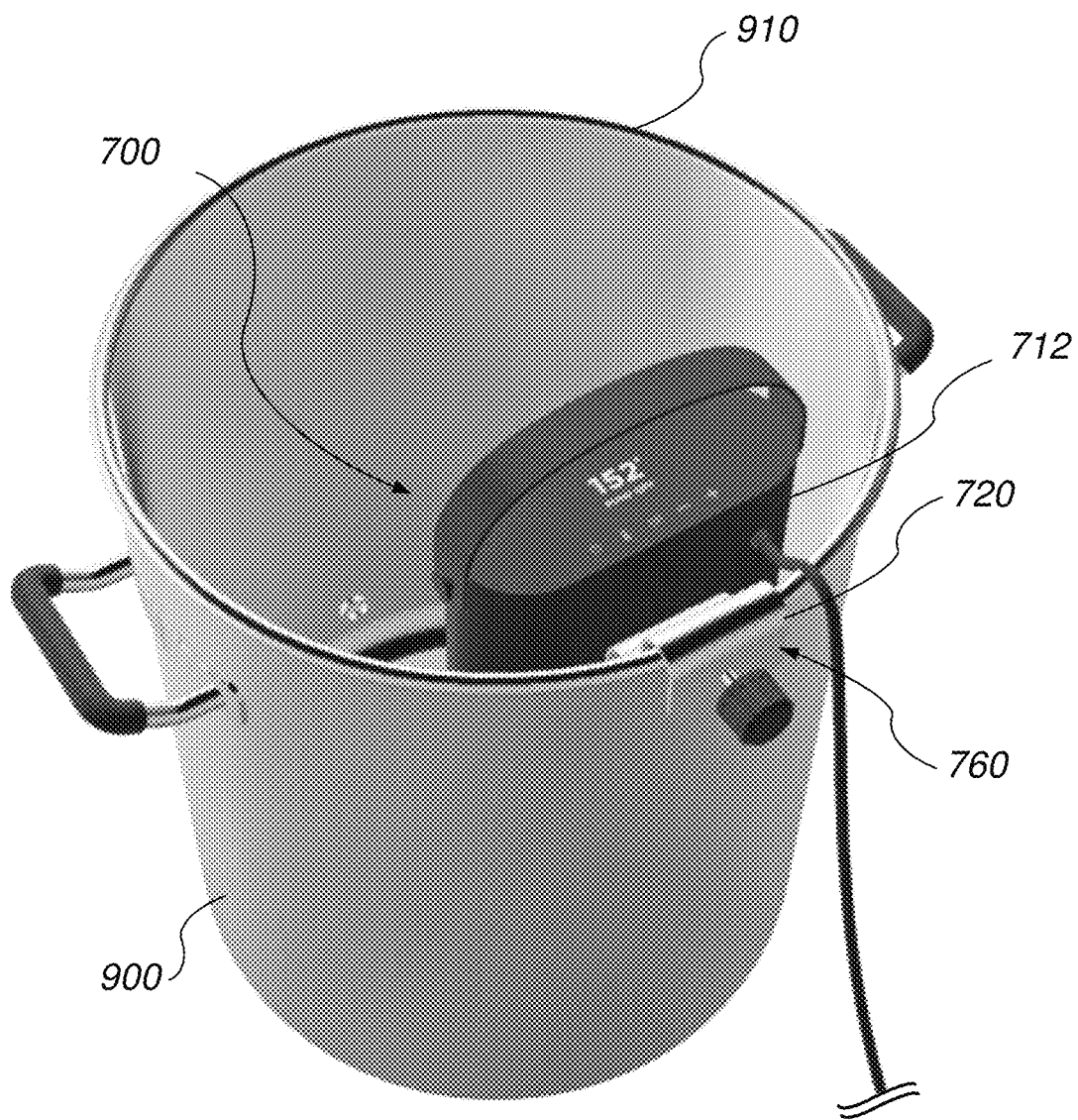
FIG. 9 is a perspective view of the immersible system of FIGS. 7 and 8 secured within a vessel using the support bracket and under control of an integrated control unit.

Referring additionally to FIG. 9, in various embodiments the immersible system 700 is shown positioned in a vessel 900. The hanger 760 is positioned in place in the vessel 900 with the clamp 720 securing the hanger 760 to a rim of the vessel 900. With the hanger 760 in place, the immersible system 700 is secured to the hanger 760, thereby removably securing the immersible system 700 to the vessel 900. The immersible system 700 may be secured to the hanger 760 using openings 780 (FIGS. 7 and 8) to position the control housing 712 above a level of the fluid in the vessel 900. In addition, the integrated control panel 346 is activated to show the immersible system 100 in use. As previously described, in various embodiments, operation of the integrated control panel 346 is controlled directly from the control section 110 via the integrated control panel 346 to, for example, activate or control a speed of the pump, set a target temperature for the liquid, and other functions.

Figure 10:
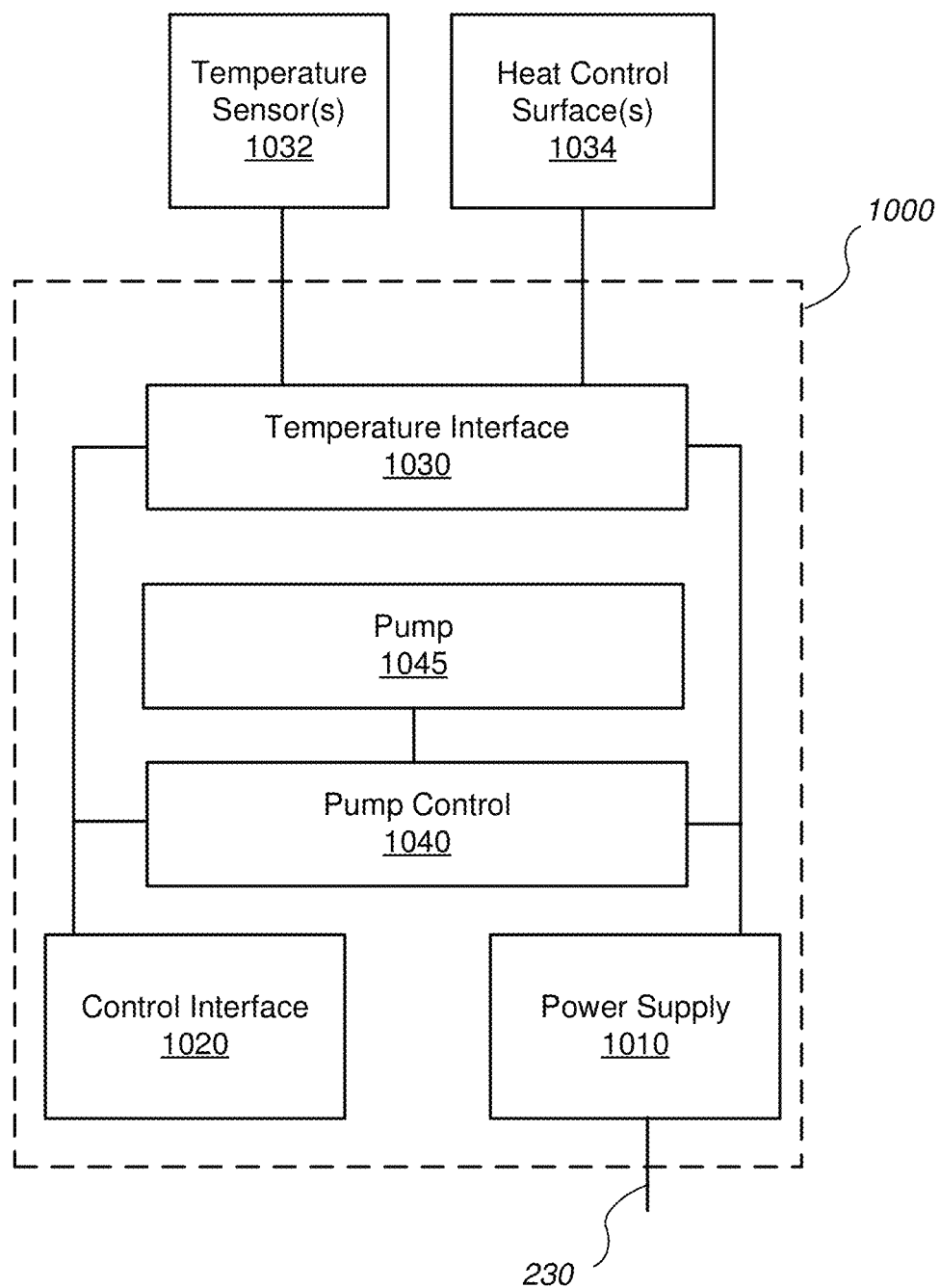
FIG. 10 is a block diagram of a control system for the immersible system.

Referring additionally to FIG. 10, in various embodiments a control system 1000 governs operation of the immersible system 100. The control system 1000, at least in part, may be housed in the control section 110. However, as further described below, all of part of the control system 1000 may be included in a detached unit. In various embodiments, the control system 1000 includes a power supply 1010, which may draw power via the power cord 230 (FIG. 2). The power supply 1010 is selectively coupled with a pump control 1040 and a temperature interface 1030 which, in turn, selectively provide power to operate the pump 1045 and the one or more temperature control surfaces 1034. A control interface 1020, such as the integrated control panel 346 or another control interface as described below, receives commands and/or displays a state of the temperature control surfaces 1034, the pump 1045, and other data. The control interface 1020 is coupled with the pump control 1040 and the temperature interface 1030 to allow user input over these systems and their associated devices. One or more temperature sensors 1032 also is coupled with the temperature interface 1030 and, in turn, to the control interface 1020 so that operation of the temperature control surface(s) 1034 and/or the pump 1045 may be controlled with respect to a temperature of the liquid. The temperature interface 1030, in conjunction with the heat sensor(s) 1032 and the temperature control surface(s) 1034 may operate as a thermostat to maintain the liquid at a desired temperature specified via the control interface 1020.

Figure 11:
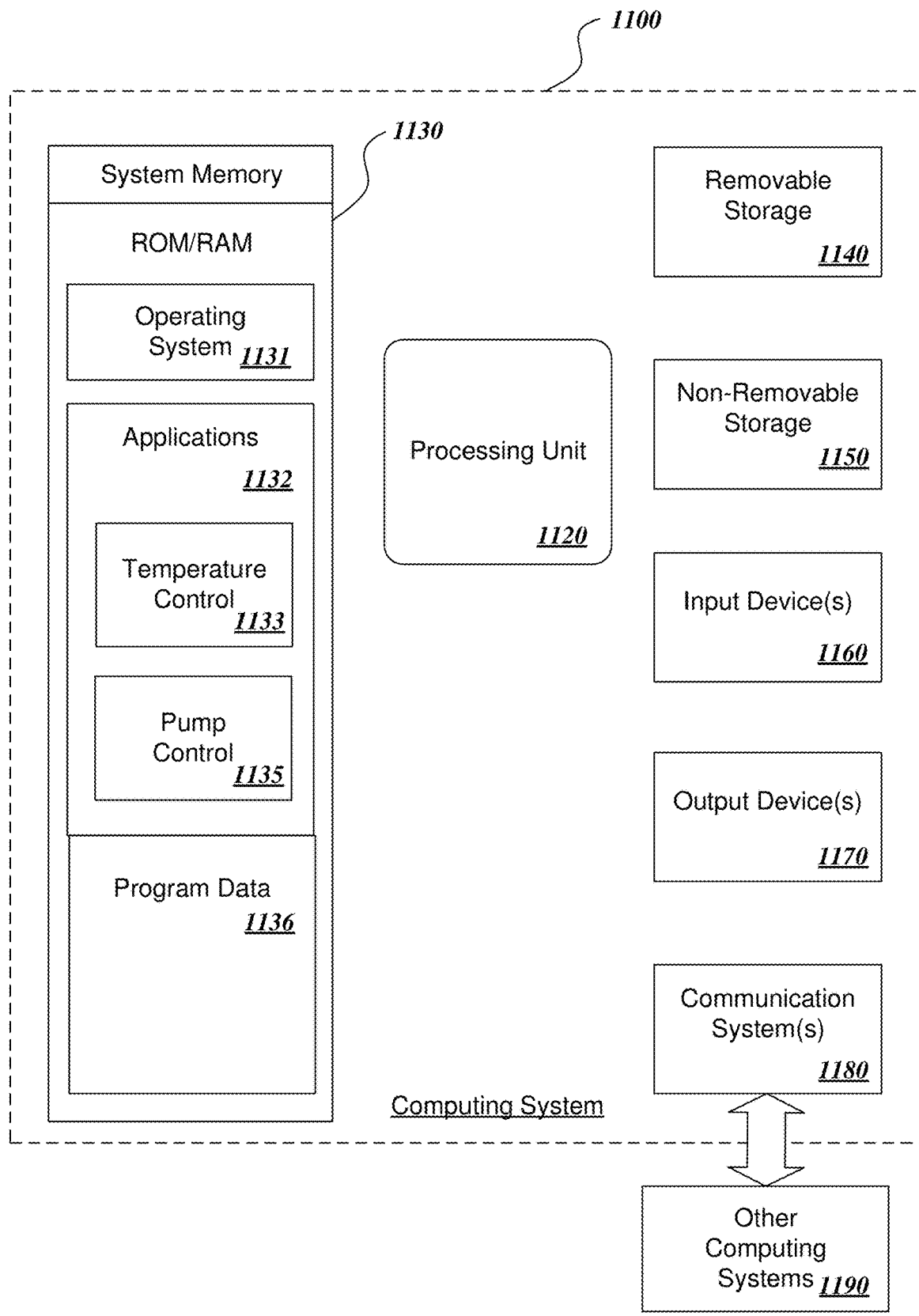
FIG. 11 is a block diagram of an illustrative computing system for controlling the immersible system.

The control system 1000 or the control interface 1020 may include a computing device. Referring additionally to FIG. 11 and given by way of example only and not of limitation, an illustrative computing device 1100 is described that may be used to control various embodiments of the immersible system 100. In various embodiments, the computing device 1100 typically includes at least one processing unit 1120 and a system memory 1130. Depending on the configuration and type of computing device, the system memory 1130 may include volatile memory, such as random-access memory ("RAM"), non-volatile memory, such as read-only memory ("ROM"), flash memory, and the like, or a combination of volatile memory and non-volatile memory. The system memory 1130 typically maintains an operating system 1131, one or more applications 1132, and program data 1136. The operating system 1131 may include any number of operating systems executable on desktop or portable devices including, but not limited to, Linux, Microsoft Windows®, Apple iOS®, or Android®, or a proprietary operating system. The applications 1132 may include a temperature control application 1133 and/or a pump control application 1135. The program data 1136 may data used by the operating system 1131, the temperature control application 1133, and/or the pump control application 1135.

The computing device 1100 may also have additional features or functionality. For example, the computing device 1100 may also include additional data storage devices (removable and/or non-removable) such as, for example, flash memory. Such additional storage devices are illustrated in FIG. 11 by removable storage 1140 and non-removable storage 1150. Computer storage media may include volatile and non-volatile, removable and non-removable media implemented in any method or technology for storage of information, such as computer-readable instructions, data structures, program modules or other data. The system memory 1130, the removable storage 1140, and the non-removable storage 1150 are all examples of computer storage media. Available types of computer storage media include, but are not limited to, RAM, ROM, flash memory (in both removable and non-removable forms) or other memory technology which can be used to store the desired information and which can be accessed by the computing device 1100. Any such computer storage media may be part of the computing device 1100.

The computing device 1100 may also have input device(s) 1160 such as a keyboard, stylus, voice input device, touchscreen input device, etc. Output device(s) 1170 such as a display, speakers, short-range transceivers such as a Bluetooth transceiver, etc., may also be included. The computing device 1100 also may include one or more communication systems 1180 that allow the computing device 1100 to communicate with other computing systems 1190, as further described below. As previously mentioned, the communication system 1180 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

As previously discussed, in various embodiments the immersible system 100 may be controlled directly via a wired, integrated control panel 346 or via a remote device 390 (FIG. 3). Other configurations for controlling the immersible system 100 using a detached control unit or a separate computing device are described below.

Figure 12:
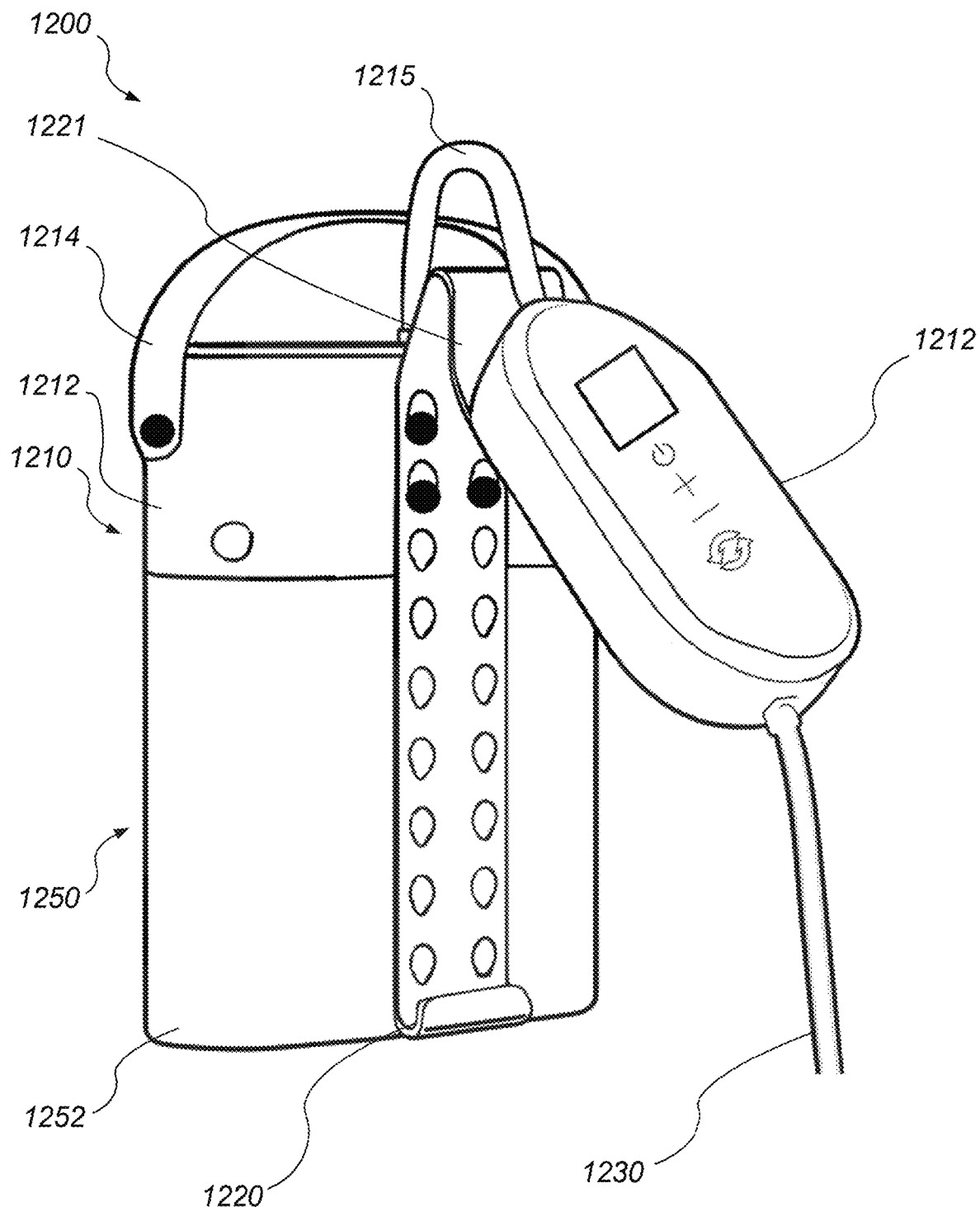
FIG. 12 is a perspective view of another embodiment of an immersible system having a detached control unit.

Referring additionally to FIG. 12, in various embodiments an immersible system 1200 is similar to the immersible system 100 of FIG. 1 but, instead of having an integrated control panel 346, the immersible system includes a detached control unit 1212. The detached control unit 1212 is coupled to a control 1210 with a control cable 1215. The detached control unit 1212 allows the electronic components incorporated in the detached control unit 1212 to be positioned at a location outside of the vessel (not shown in FIG. 12) and, thus, not positioned directly above or adjacent to the liquid in the vessel. By removing the detached control unit 1212 from the liquid, the control unit 1212 (and a user thereof) will not be within a direct flow of steam from the surface of the liquid as well as at a position that reduces the possibility of liquid splashing on the detached control unit 1212.

In various embodiments the immersible system 1200 includes the control section 1210 having a control housing 1212 containing a pump, temperature interface(s), and supporting components and an immersible section 1250 supporting one or more temperature control surfaces and a pump inlet (not shown in FIG. 12) within a filtration housing 1252. A handle 1214 that extends from the control housing 1212 to allow for the entire immersible system 1200 to be moved into or out of vessels that contain liquid therein. A support bracket 1220 is included to engage a side of a vessel (not shown in FIG. 12) to support the immersible system 1200.

In various embodiments, the detached control unit 1212 is coupled to the control section 1210 with a control cable 1215 and receives a power cable 1230. The detached control unit 1212 thus provides and/or controls a supply of electrical power supplied to the control section 1210 and eventually to the pump and the one or more temperature control surfaces (not shown in FIG. 12). In various embodiments, the support bracket 1220 includes a control unit mount 1221 to support the detached control unit 1212 outside of the vessel (not shown in FIG. 12). In various embodiments, the control unit mount 1221 includes a ledge, a mechanical mount, or magnetic mount to secure the detached control unit 1212 when it is placed in the control unit mount 1221. As further described below, in various embodiments the control cable 1215 is detachable from the control section 1210 so that the detached control unit 1212 may be coupled with another device to provide electrical power and/or control signals to a control section of another immersible system (not shown in FIG. 12) or another device having temperature control surfaces or a pump, as further described below. User control of the immersible system 1200 via the detached control unit 1212 is similar to how user control is performed using an integrated control panel 346 or a remote control device 390, as further described below.

Figure 13A:
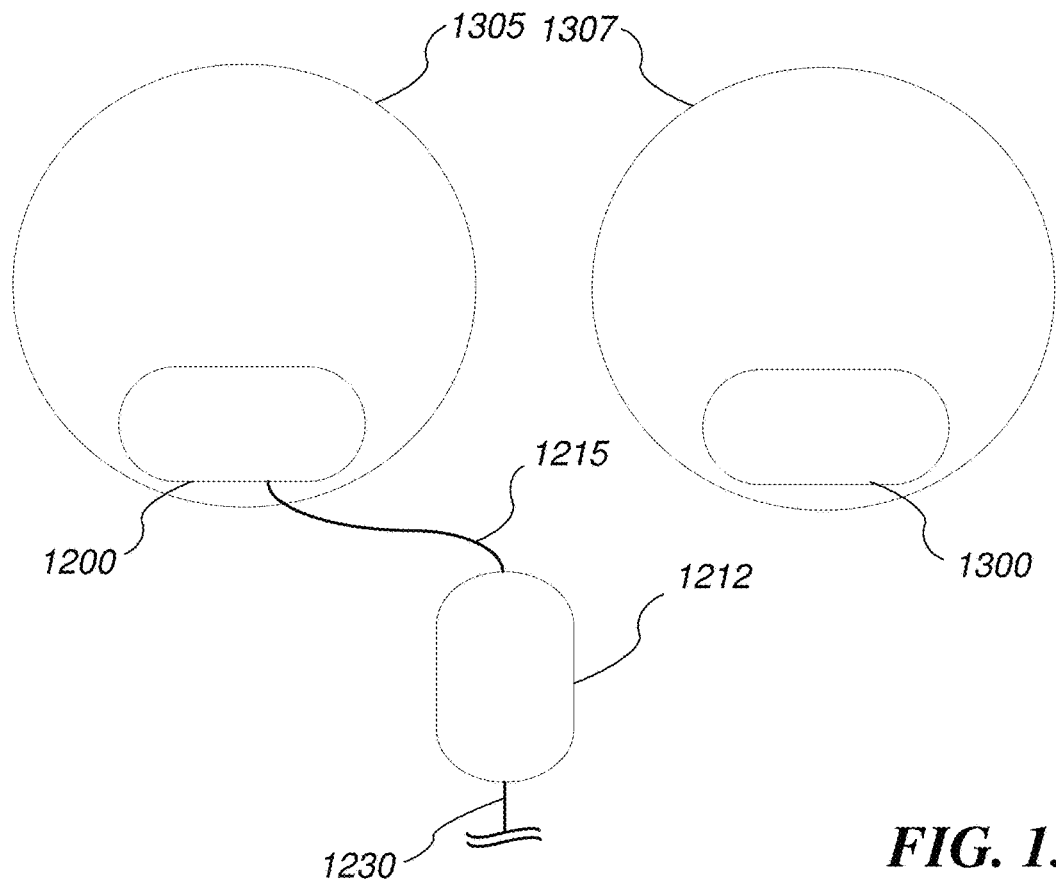
FIGS. 13A-13B are plan views of the detachable control unit of FIG. 12 alternately controlling different systems.
Figure 13B:
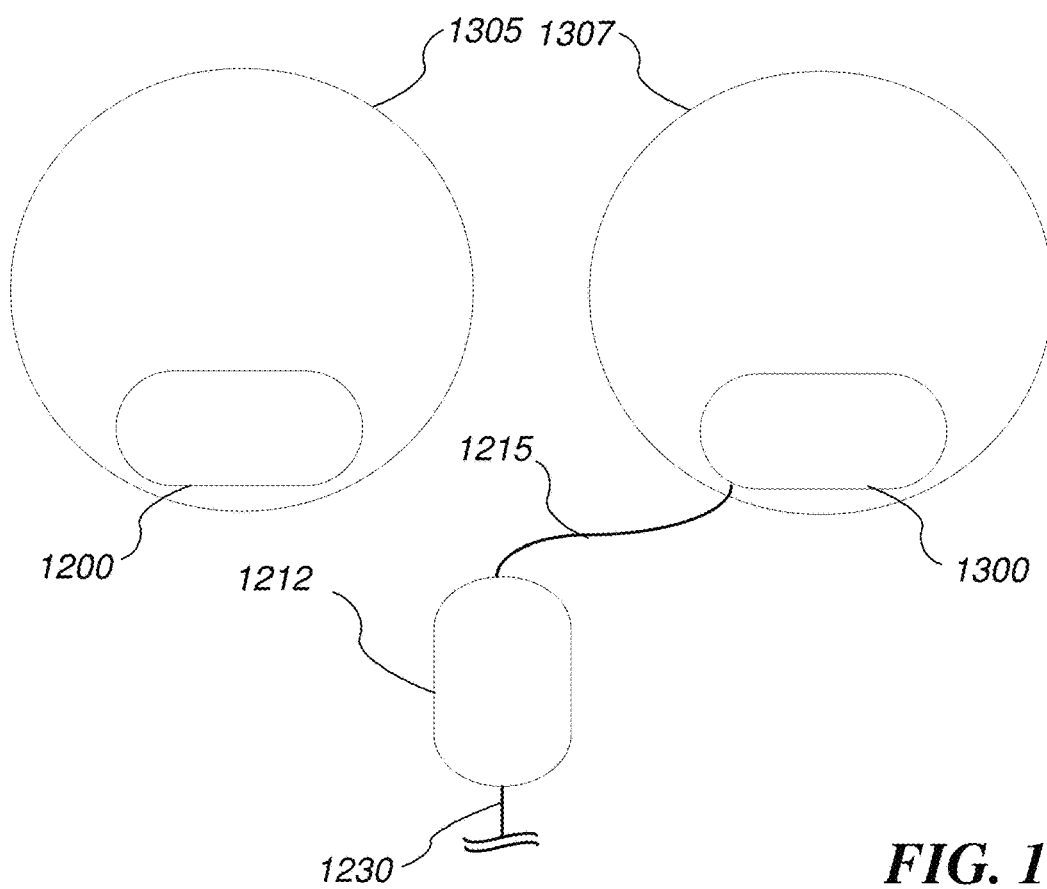

As previously described, in various embodiments the detached control unit 1212 includes a control cable 1215 that is detachable from the control section 1210 of the immersible system 1200. Referring additionally to FIGS. 13A and 13B, the detached control unit 1212 is separately connected with two different devices including the immersible system 1200 in FIG. 13A and a second system 1300 in FIG. 13B. In FIG. 13A, the detached control unit 1212 is coupled via the control cable 1215 to the immersible system 1200 inserted in a first vessel 1305. Able to receive electrical power via the power cable 1230, the detached control unit 1212 thus is able to provide power and control signals to the immersible system 1200. In FIG. 13B, the control cable 1215 is disconnected from the immersible system 1200 in the first vessel 1305 and reconnected to the second system 1300 inserted in the second vessel 1307. Able to receive electrical power via the power cable 1230, the detached control unit 1212 thus is able to provide power and control signals to the second system 1300, such as by providing control signals and power to a pump and/or one or more temperature control surfaces (not shown) associated with the second system 1300. Thus, the detached control unit 1212 is usable to, for example, control two different immersible systems or two other systems to control operation thereof.

Thus, for example, in various embodiments the detached control unit 1212 may be used to control a mashing and boiling process in the first vessel 1305 and then to control another mashing and boiling process or a different process in the second vessel 1307. It will be appreciated that the second system 1300 could be inserted in the first vessel 1305 and the detached control unit 1212 could control a subsequent process in the first vessel 1307 via the second system 1300.

Figure 14:
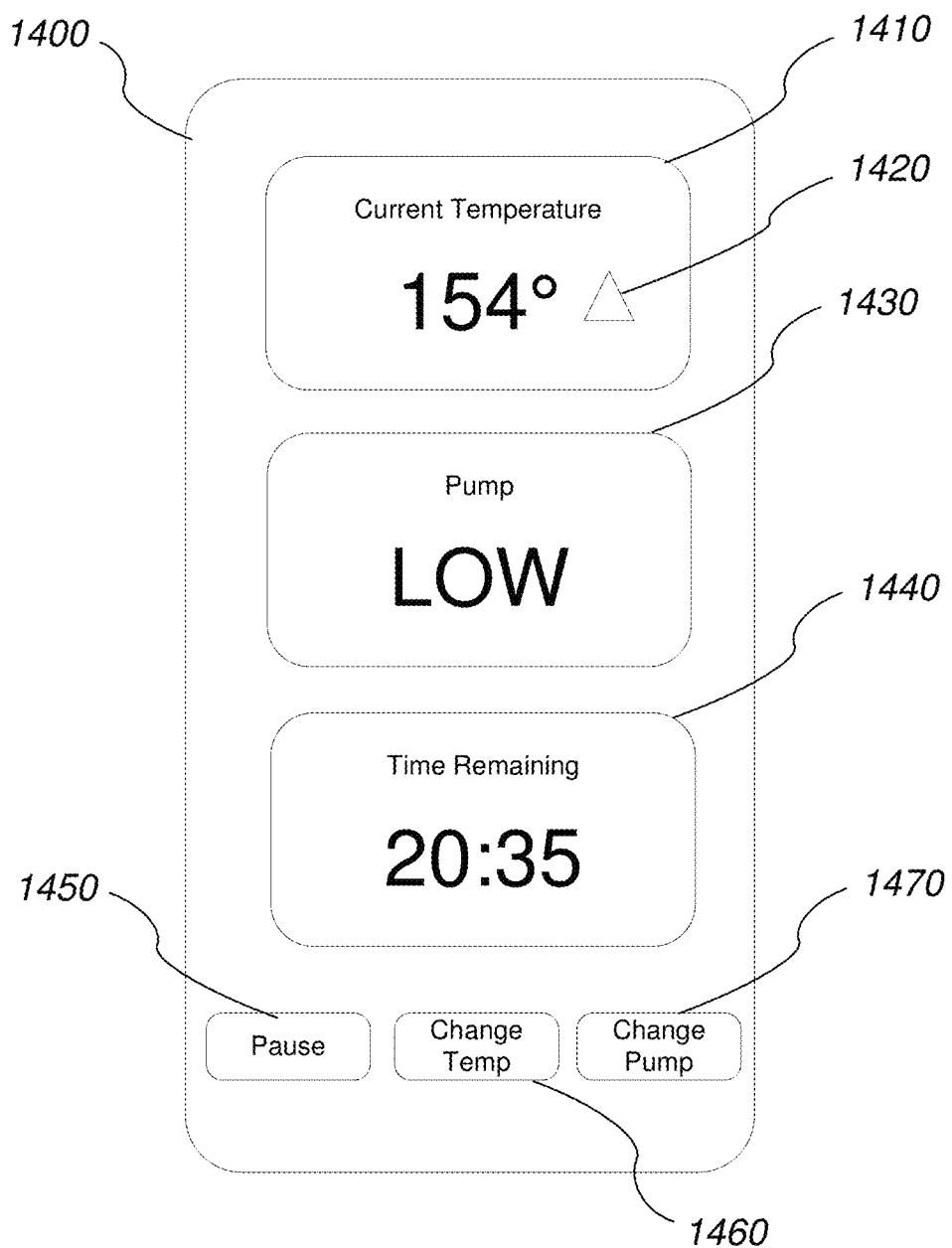
FIG. 14 is a block diagram of a remote computing device usable to monitor or control the immersible systems of FIGS. 1, 7-9, and 12.

Referring additionally to FIG. 14, in various embodiments a computing system 1400 separate from the immersible system 100, 700, or 1200 may be used to remotely monitor and/or control operation of the immersible system 100, 700, or 1200. As previously described, the computing system 1400 may include a computing device 1100 (FIG. 11) and may be in the form of a smartphone, a smartwatch, a tablet computer, a portable computer, or a desktop computer. In various embodiments, the computing system 1400 will include an application, such as a dedicated application or a browser, through which the computing system 1400 may communicate with a control section 110, 710, or 1210 of the immersible system 100, 700, or 1200. The application may include computer-executable instructions stored in a computer-readable medium and accessible by the computing system 1400 to direct the computing system 1400 to interoperate with the immersible system 100, 700, or 1200.

In various embodiments, the computing system 1400 is configured to report a state of the immersible system 100, 700, or 1200, including a first output 1410 indicating a current temperature of the liquid reported by the temperature sensor(s) 1032 (FIG. 10). The computing system 1400 also may report second output 1420 indicating a state of the temperature control surface(s) 1412 reported from the temperature control surfaces 1034 via the temperature interface 1030 (FIG. 10). The computing system 1400 also may report a third output 1430 indicating a state of the pump 1045 (FIG. 10). The computing system 1400 also may report a fourth output 1440 indicating a remaining time programmed for the current operation. The computing system 1400 also may include inputs such as a first input 1440, a second input 1450, and a third input 1460 to pause, change the temperature setting, or change the pump setting, respectively. On a touchscreen device such as a smartphone, the outputs 1410, 1420, 1430, and 1440 may be presented and the inputs 1450, 1460, and 1470 may be received via a touchscreen. On a computer or another device, the outputs 1410, 1420, 1430, and 1440 may be presented via a display and the inputs 1450, 1460, and 1470 may be received via a keyboard and/or other input device. As previously described, the computing system 1400 may communicate with the immersible system 100, 700, or 1200 via Wi-Fi, Bluetooth, wireless telephony, and/or a dedicated radio frequency protocol or a wired connection.

Figure 15:
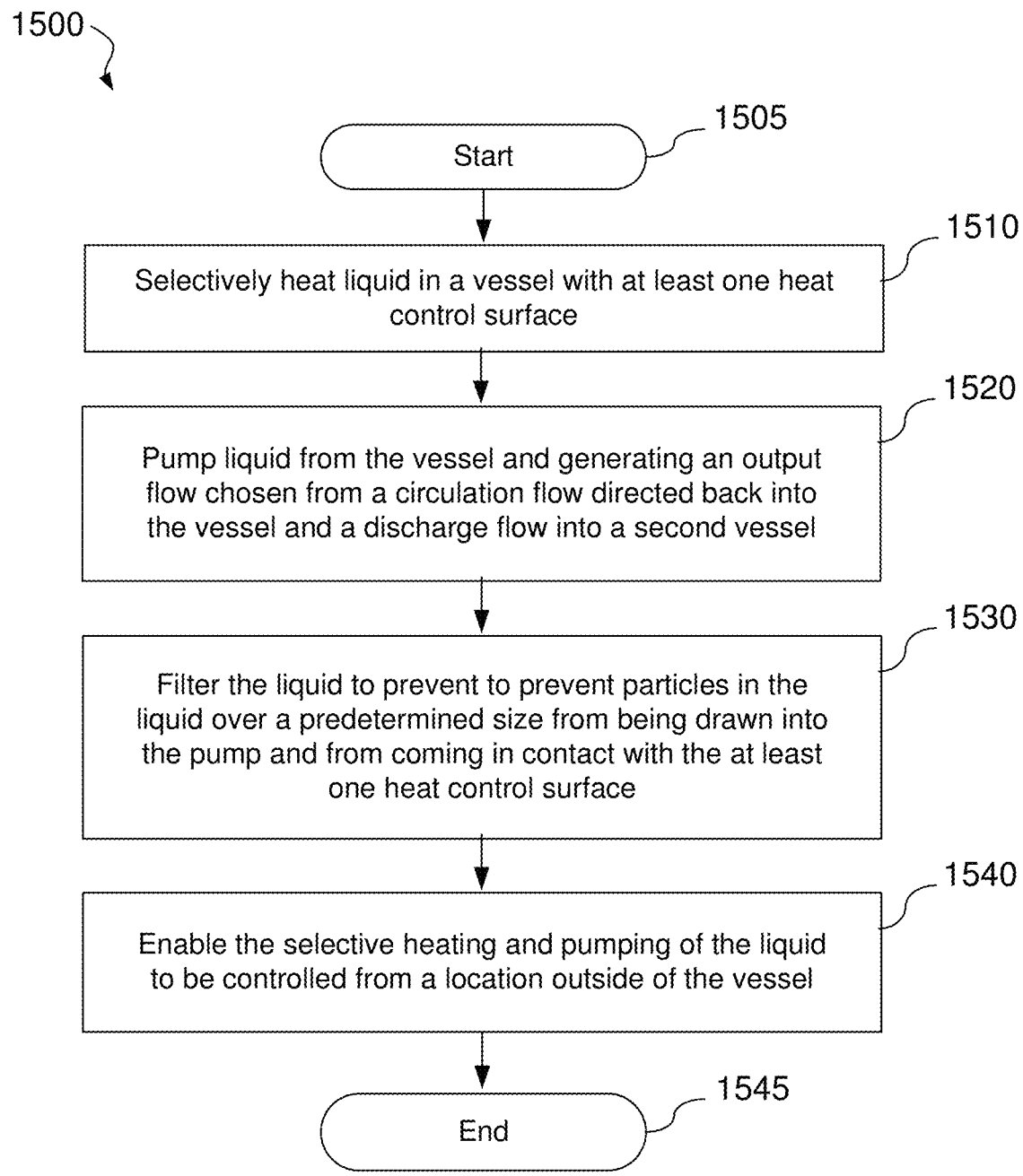
FIGS. 15 and 16 are flow charts of illustrative methods of circulating and managing a temperature of a liquid.

Referring additionally to FIG. 15, in various embodiments an illustrative method 1500 of using an immersible system is provided. After the immersible system is inserted into a liquid, the method 1500 starts at a block 1505. At a block 1510, liquid is selectively heated in a vessel with at least one temperature control surface. At block 1520, liquid is pumped from the vessel and generates an output flow chosen from a circulation flow directed back into the vessel and a discharge flow into a second vessel. At a block 1530, the liquid is filtered as it is drawn into the pump prevent to prevent particles in the liquid over a predetermined size from entering the pump and from coming in contact with the at least one temperature control surface. At a block 1540, the selective heating of the liquid by the at least one temperature control surface and pumping of the liquid by the pump is enabled to be controlled from a location outside of vessel. The method ends at a block 1545

Figure 16:
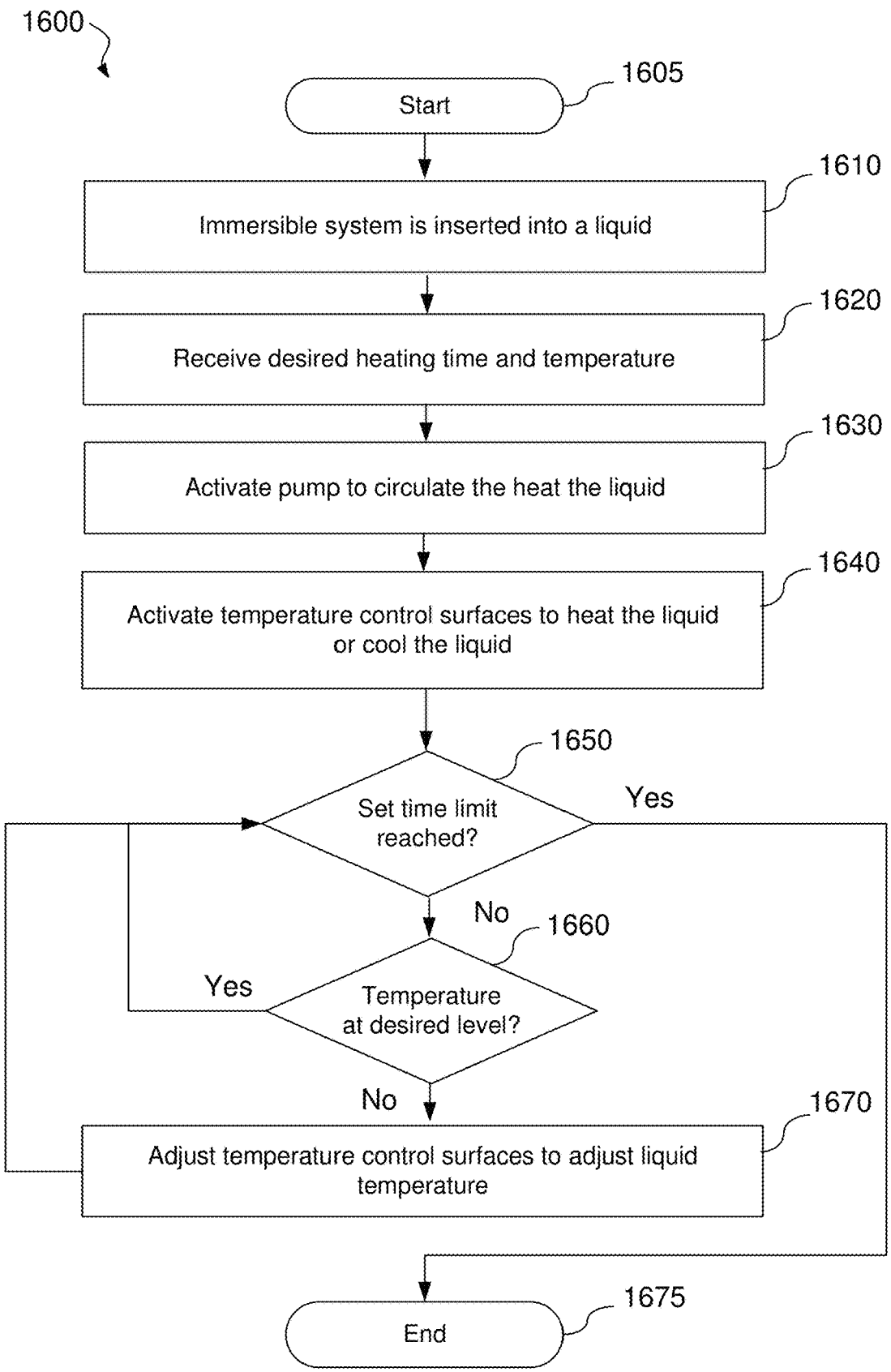

Referring additionally to FIG. 16, in various embodiments another illustrative method 1600 of using an immersible system is provided. The method 1600 starts at a block 1605. At a block 1610, the immersible system is inserted into a liquid. At block 1620, a desired heating time and temperature are received, such as by an operator entering these settings via the control panel 346 or the remote control device, as described with reference to FIG. 3. At a block 1630, the pump is activated to circulate the liquid. At a block 1640, temperature control surfaces are activated to heat the liquid or cool the liquid. At a decision block 1650, a determination is made whether the set time limit is reached. If so, then the method 1600 ends at a block 1675. If not, then at a decision block 1660 a determination is made whether the temperature of the liquid is at a desired level. If so, then the method 1600 returns to the decision block 1650 to determine if the time limit has been reached. If not, then at a block 1670, the temperature control surfaces are adjusted to adjust the temperature of the liquid. The method 1600 then returns to the decision block 1650. At a block 1680, the temperature control surfaces are deactivated and the method returns to the block 1660 to continue monitoring the temperature level of the liquid. If it is determined at the block 1670 that the temperature of the liquid is not at the desired level, then the method returns to the block 1650 until it is determined that the set time limit has been reached.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus for insertion into a vessel containing liquid and adapted to heat or cool the liquid and circulate the liquid to promote even heating or cooling of the liquid contained in the vessel, the apparatus comprising:
   a control section including:
      a pump configured to receive the liquid and expel the liquid via a pump outlet;
      a temperature interface configured to modulate a supply of energy; and
      a control interface configured to direct operation of the pump and the temperature control interface; and
   an immersible section extending from the control section and configured to be at least partially immersed in the vessel containing the liquid, the immersible section including:
      at least one temperature control surface operably coupled with the temperature interface and configured to heat the liquid in response to the energy received from the temperature interface;
      a pump inlet coupled to the pump and configured to draw the liquid into the pump; and
      a filtration housing covering the at least one temperature control surface and the at least one pump inlet, wherein the at least one temperature control surface and the pump inlet are enclosed within the filtration housing such that the filtration housing is configured to block particles over a predetermined size from passing into the pump inlet and coming into contact with the at least one temperature control surface, and wherein a majority of the filtration housing comprises a filter.

2. The apparatus of claim 1, wherein the control interface is configured to receive at least one control signal from at least one user interface chosen from a wired interface and a wireless interface.

3. The apparatus of claim 2, wherein the at least one control signal is chosen from a pump signal configured to direct operation of the pump and a temperature signal configured to direct operation of the at least one temperature control surface.

4. The apparatus of claim 2, wherein the wired interface is chosen from an integrated control panel incorporated into the control section and a detached control unit coupled to the control section via a control cable.

5. The apparatus of claim 4, further comprising an interface bracket configured to support the detached control unit outside of the vessel.

6. The apparatus of claim 4, wherein the control cable is configured to be detachable from the control section and couplable with a secondary apparatus having a secondary temperature control interface to receive a secondary control signal from the detachable control unit.

7. The apparatus of claim 4, wherein the detached control unit is configured to receive a power cable configured to convey electric power to the control section via the control cable.

8. The apparatus of claim 2, wherein the wireless interface is configured to receive the at least one control signal via at least one protocol chosen from Wi-Fi, Bluetooth, wireless telephony, and a dedicated radio frequency protocol.

9. The apparatus of claim 1, further comprising a support bracket configured to engage a wall of the vessel and to support at least one section chosen from the control section and the immersible section relative to the wall of the vessel.

10. The apparatus of claim 1, wherein the pump outlet is configurable to provide an output flow chosen from a circulation output configured to circulate the liquid within the vessel and a discharge output configured to pump the liquid out of the vessel.

11. The apparatus of claim 10, wherein the pump outlet includes a reconfigurable output chosen from a movable output line configured to be moved between an interior of the vessel and a second vessel and an interchangeable output line including a circulation output line configured to circulate the liquid within the vessel and a transfer output line configured to transfer the liquid into the second vessel.

12. The apparatus of claim 1, wherein the filtration housing is configured to be removable for at least one operation chosen from replacement and cleaning.

13. The apparatus of claim 1, wherein the control section further comprises a control housing containing each of the pump, temperature interface, and temperature control interface.

14. The apparatus of claim 13, wherein, in use, the pump inlet is configured to be positioned below a surface level of the liquid contained in the vessel, and the pump is configured to be positioned above the surface level of the liquid contained in the vessel.

15. The apparatus of claim 1, wherein the filtration housing is configured as a screen member comprising a plurality of perforation throughout a majority of the filtration housing.

16. The apparatus of claim 1, wherein the filtration housing comprises a mesh frame coupled with a mesh material such that a plurality of perforation are defined throughout a majority of the filtration housing.

17. A system for insertion into a vessel containing liquid and adapted to heat or cool the liquid and circulate the liquid to promote even heating or cooling of the liquid contained in the vessel, the system comprising:
   a control section including:
   a pump configured to receive the liquid and expel the liquid via a pump outlet configurable to provide a flow chosen from a circulation output configured to circulate the liquid within the vessel and a discharge output configured to pump the liquid out of the vessel; and
   a temperature interface configured to modulate a supply of thermal energy;
   an immersible section extending from the control section and configured to be at least partially immersed in the liquid, the immersible section including:
   at least one temperature control surface operably coupled with the temperature interface and configured to heat the liquid in response to the energy received from the temperature interface;
   a pump inlet coupled to the pump and configured to draw the liquid into the pump; and
   a removable filtration housing covering the at least one temperature control surface and the at least one pump inlet, wherein the at least one temperature control surface and the pump inlet are enclosed within the filtration housing such that the filtration housing is configured to block particles over a predetermined size from passing into the pump inlet and coming into contact with the at least one temperature control surface, and wherein a majority of the filtration housing comprises a filter; and
   a detached control unit electrically couplable with the control section and configured to direct operation of the pump and the temperature control interface from outside of the vessel.

18. An apparatus for insertion into a vessel containing liquid and adapted to heat or cool the liquid and circulate the liquid to promote even heating or cooling of the liquid contained in the vessel, the apparatus consisting of:
   a control section consisting of:
   a control housing;
   a plurality of internal control components housed within the control housing and comprising:
   a pump configured to receive the liquid and expel the liquid via a pump outlet; and
   a temperature interface configured to modulate a supply of energy; and
   a control interface configured to direct operation of the pump and the temperature control interface; and
   an immersible section extending from the control section and configured to be at least partially immersed in the vessel containing the liquid, the immersible section consisting of:
   a filtration housing;
   a plurality of internal immersible components housed within the filtration housing and comprising:
   at least one temperature control surface operably coupled with the temperature interface and configured to heat the liquid in response to the energy received from the temperature interface; and
   a pump inlet coupled to the pump and configured to draw the liquid into the pump,
   wherein the filtration housing is configured to cover the at least one temperature control surface and the at least one pump inlet, wherein the at least one temperature control surface and the pump inlet are enclosed within the filtration housing such that the filtration housing is configured to block particles over a predetermined size from passing into the pump inlet and coming into contact with the at least one temperature control surface, and wherein a majority of the filtration housing comprises a filter.

19. The apparatus of claim 18, wherein the filtration housing is configured as a screen member comprising a plurality of perforation throughout a majority of the filtration housing.

20. The apparatus of claim 18, wherein the filtration housing consists of a mesh frame coupled with a mesh material such that a plurality of perforation are defined throughout a majority of the filtration housing.

* * * * *